United States Patent
Alloway et al.

(10) Patent No.: US 11,300,075 B2
(45) Date of Patent: Apr. 12, 2022

(54) ENGINE EXHAUST SKIN CONNECTION SYSTEM

(71) Applicant: Rohr, Inc., Chula Vista, CA (US)

(72) Inventors: Richard S. Alloway, San Diego, CA (US); Vijay V. Pujar, San Diego, CA (US); Jinqiu Lu, Murrieta, CA (US); Adam Saunders, El Cajon, CA (US); Gary E. Bowman, Lenzie (GB)

(73) Assignee: Rohr, Inc., Chula Vista, CA (US)

( * ) Notice: Subject to any disclaimer, the term of this patent is extended or adjusted under 35 U.S.C. 154(b) by 412 days.

(21) Appl. No.: 16/299,961

(22) Filed: Mar. 12, 2019

(65) Prior Publication Data

US 2020/0291889 A1 Sep. 17, 2020

(51) Int. Cl.
| | |
|---|---|
| *F02K 1/04* | (2006.01) |
| *F01D 25/28* | (2006.01) |
| *F01D 25/24* | (2006.01) |
| *F01D 25/30* | (2006.01) |
| *F02K 1/80* | (2006.01) |

(52) U.S. Cl.
CPC .............. *F02K 1/04* (2013.01); *F01D 25/243* (2013.01); *F01D 25/28* (2013.01); *F01D 25/30* (2013.01); *F02K 1/80* (2013.01); *F05D 2300/6033* (2013.01)

(58) Field of Classification Search
CPC ..... F02K 1/04; F02K 1/80; F02K 1/82; F01D 25/243; F01D 25/28; F01D 25/30; F02C 7/20; F05D 2300/6033; B64D 33/04; F16B 5/01; F16B 5/02
See application file for complete search history.

(56) References Cited

U.S. PATENT DOCUMENTS

| | | | |
|---|---|---|---|
| 6,045,310 A | 4/2000 | Miller et al. | |
| 6,895,761 B2 | 5/2005 | Mitchell et al. | |
| 6,904,757 B2 | 6/2005 | Mitchell et al. | |
| 7,722,317 B2 | 5/2010 | Schiavo et al. | |
| 7,874,059 B2 | 1/2011 | Morrison et al. | |
| 8,197,191 B2 * | 6/2012 | Binks .................... | B64D 33/02 |
| | | | 415/119 |
| 8,424,312 B2 | 4/2013 | Conete et al. | |
| 9,732,701 B2 * | 8/2017 | Lu .......................... | F01D 25/30 |
| 9,784,215 B2 | 10/2017 | Lu et al. | |

(Continued)

OTHER PUBLICATIONS

EP search report for EP19212400.6 dated Jul. 10, 2020.

*Primary Examiner* — Gerald L Sung
*Assistant Examiner* — Rodolphe Andre Chabreyrie
(74) *Attorney, Agent, or Firm* — Getz Balich LLC

(57) ABSTRACT

A mechanical connection system is provided that includes a ceramic skin panel, at least one bushing, and at least one bolt. The ceramic skin panel includes a first surface, a second surface, and at least one aperture extending between the first surface and the second surface. The aperture has an axial centerline, a chamfered portion contiguous with the first surface, and an axial portion contiguous with the second surface. The chamfered portion includes a tapered surface disposed at a first angle such that a line extending along the tapered surface intersects the axial centerline at a plane of the second surface. The bushing has a housing and a collar. The housing is configured to mate with the chamfered portion of the aperture disposed within the ceramic skin panel. The collar is configured for engagement with the housing.

20 Claims, 6 Drawing Sheets

(56) References Cited

U.S. PATENT DOCUMENTS

| | | |
|---|---|---|
| 9,963,990 B2 | 5/2018 | Vetters et al. |
| 10,995,698 B2 * | 5/2021 | Todorovic ................ F02K 1/80 |
| 2010/0023901 A1 * | 1/2010 | Moroz ................ G06F 30/367 |
| | | 716/136 |
| 2010/0205930 A1 * | 8/2010 | Conete ...................... F02K 1/78 |
| | | 60/226.1 |
| 2012/0023901 A1 * | 2/2012 | Gilson ...................... F02K 3/06 |
| | | 60/226.3 |
| 2014/0241863 A1 * | 8/2014 | Tardif ...................... F02K 1/48 |
| | | 415/145 |
| 2016/0131083 A1 | 5/2016 | Lu |
| 2017/0059166 A1 | 3/2017 | Bloom |
| 2017/0138219 A1 * | 5/2017 | Knight ...................... F02K 1/80 |
| 2017/0167296 A1 | 6/2017 | Renggli |
| 2017/0175801 A1 * | 6/2017 | Mickelsen ................ F02C 7/25 |

* cited by examiner

ENGINE EXHAUST SKIN CONNECTION SYSTEM

BACKGROUND OF THE INVENTION

1. Technical Field

The present disclosure relates to turbine engine systems in general, and to attachment systems for use with turbine engine systems in particular.

2. Background Information

Gas turbine engines are often utilized with a nacelle system that may include a centerbody, a nozzle, a nozzle fairing, a pylon fairing, and an aft core cowl. Certain elements within a nacelle system may be disposed within very high temperature environment during operation of the gas turbine engine. For example, a nacelle system may include an exhaust nozzle assembly liner disposed aft of the combustor and turbine sections of the engine to confine and direct extreme high temperature exhaust gases. To accommodate these high temperature environments, it is known to utilize a liner panel comprising a high temperature material such as a ceramic matrix composite attached to a support structure. Ceramic materials in general have a higher temperature capability than most metals, but also typically have a much lower coefficient of thermal expansion ("CTE") than most metals, and also typically a lower mechanical strength than most metals. Most nacelle system liner panel applications are subject to thermal cycling during operation; e.g., cyclic periods of high temperature exposure and periods of low temperature (e.g., ambient) exposure. In a liner embodiment that includes a ceramic panel attached to a metallic panel or support structure, the metallic portion will expand to a much greater degree than the ceramic panel as the structure is subjected to a high temperature environment and retract to a greater degree when the high temperature environment is removed. Thus, a mechanical attachment mechanism used to attach a panel to a support structure must take into account the differences in CTEs between the ceramic panel and the metallic support structure, and the concomitant relative expansion and movement between the different material components.

Accordingly, there is a need for a mechanical attachment mechanism that may be utilized with a nacelle system structure that takes into account the differences in CTEs and the concomitant relative expansion and movement between the different material components.

SUMMARY OF THE INVENTION

According to an aspect of the present disclosure, a mechanical connection system is provided. The system includes a ceramic skin panel, at least one bushing, and at least one bolt. The ceramic skin panel includes a first surface, a second surface, and at least one aperture extending between the first surface and the second surface. The aperture has an axial centerline, a chamfered portion contiguous with the first surface, and an axial portion contiguous with the second surface. The chamfered portion includes a tapered surface disposed at a first angle such that a line extending along the tapered surface intersects the axial centerline at a plane of the second surface. The bushing has a housing and a collar. The housing has a head configured to mate with the chamfered portion of the at least one aperture disposed within the ceramic skin panel, and a body configured to extend within the at least one aperture. The collar is configured for engagement with the housing from the second surface side of the ceramic skin panel. The bolt is configured for engagement with the bushing and a support structure.

According to another aspect of the present disclosure, a gas turbine engine nacelle is provided that includes an annular support structure, a plurality of ceramic skin panels, and a plurality of connection systems. The plurality of ceramic skin panels are attached to the annular support structure, and the plurality of ceramic skin panels collectively forming at least a portion of a first annular duct. Each ceramic skin panel has a first surface, a second surface, and a plurality of apertures extending between the first surface and the second surface. The apertures each having an axial centerline, a chamfered portion contiguous with the first surface, and an axial portion contiguous with the second surface. The chamfered portion includes a tapered surface disposed at a first angle such that a line extending along the tapered surface intersects the axial centerline at a plane of the second surface. The plurality of connection systems each connect a respective one of the ceramic skin panels to the support structure. Each connection system includes a bushing for connecting the ceramic skin panel to the annular support structure. Each bushing has a housing and a collar. The housing has a head configured to mate with the chamfered portion of one of the apertures disposed within the ceramic skin panel, and a body configured to extend within the aperture. The collar is configured for engagement with the housing from the second surface side of the ceramic skin panel, and a bolt configured for engagement with the bushing and the support structure.

In any of the aspects or embodiments described above and herein, a connection system may include a nut plate affixed to the support structure, wherein the bolt is configured for engagement with the support structure via the nut plate.

In any of the aspects or embodiments described above and herein, a ceramic skin panel may comprise a ceramic matrix composite.

In any of the aspects or embodiments described above and herein, a ceramic skin panel may have a first coefficient of thermal expansion (CTE) value, and the support structure may have a second CTE value, and the first CTE value is less than the second CTE value.

In any of the aspects or embodiments described above and herein, the support structure may comprise a metallic material.

In any of the aspects or embodiments described above and herein, the support structure may comprise a nickel alloy.

In any of the aspects or embodiments described above and herein, a collar may include a head, a body, and a center bore extending through the body, and a ceramic skin panel may be arcuately shaped to form a part of an annular structure. A connection system may include a washer having a first contact surface and a second contact surface, wherein the second contact surface is opposite the first contact surface. The first contact surface may be configured to mate with the head of the collar and the second contact surface may be configured to mate with the arcuate shape of the ceramic skin panel. The washer is disposed between the collar and the ceramic skin panel.

In any of the aspects or embodiments described above and herein, the housing, the collar, and the washer may be configured to permit sufficient compressive attachment of the bushing to the ceramic skin panel in an amount that prevents rotation of the bushing relative without deformation of the ceramic skin panel in an amount that produces detrimental mechanical properties within the ceramic skin panel.

In any of the aspects or embodiments described above and herein, the plurality of ceramic skin panels attached to the annular support structure, may include a plurality of inner skin panels that collectively form the at least a portion of the first annular duct, and a plurality of outer skin panels that collectively form at least a portion of a second annular duct disposed radially outside of the first annular duct.

In any of the aspects or embodiments described above and herein, a first number of the plurality of connection systems may connect the inner skin panels to the support structure and a second number of the plurality of connection systems may connect the outer skin panels to the support structure.

In any of the aspects or embodiments described above and herein, the nacelle may include a seal disposed between an aft portion of at least one of the inner skin panels and an aft portion of a respective one of the outer skin panels. The seal may be attached to the aft portion of the at least one of the inner skin panels, or the aft portion of the respective one of the outer skin panels, or both.

In any of the aspects or embodiments described above and herein, the seal may extend circumferentially between the aft portions of all of the plurality of inner skin panels and the aft portion of all of the plurality of the outer skin panels.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Figure 1:
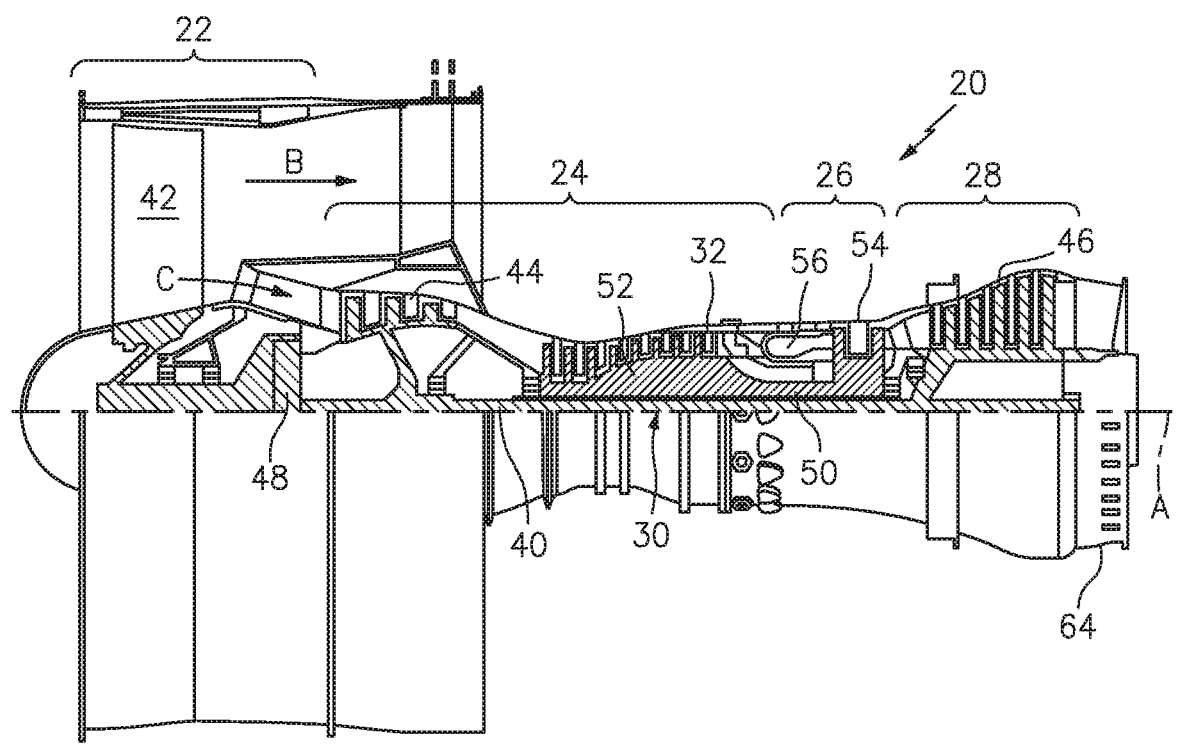
FIG. 1 is a diagrammatic view of a partially sectioned gas turbine engine embodiment.

Referring to FIG. 1, to facilitate the description of the present disclosure a two-spool turbofan type gas turbine engine 20 is shown. This exemplary embodiment of a gas turbine engine includes a fan section 22, a compressor section 24, a combustor section 26, a turbine section 28. The fan section 22 drives air along a bypass flow path "B" in a bypass duct, while the compressor section 24 drives air along a core flow path "C" for compression and communication into the combustor section 26 then expansion through the turbine section 28. Although a two-spool turbofan gas turbine engine is described herein to facilitate the description of the present disclosure, it should be understood that the present disclosure is not limited to use with two-spool turbofans as the teachings may be applied to other types of turbine engines; e.g., three-spool architectures.

The exemplary engine 20 shown in FIG. 1 includes a low speed spool 30 and a high speed spool 32 mounted for rotation about an engine central longitudinal axis "A". The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the exemplary gas turbine 20 between the high pressure compressor 52 and the high pressure turbine 54. The inner shaft 40 and the outer shaft 50 are concentric and rotate about the engine central longitudinal axis "A". The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. The core airflow and combustion products exit the exhaust nozzle 64 at the aft of the engine. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48. The gas turbine engine 20 diagrammatically depicted in FIG. 1 is provided as a non-limiting example of a gas turbine engine to facilitate the description herein.

Figure 2:
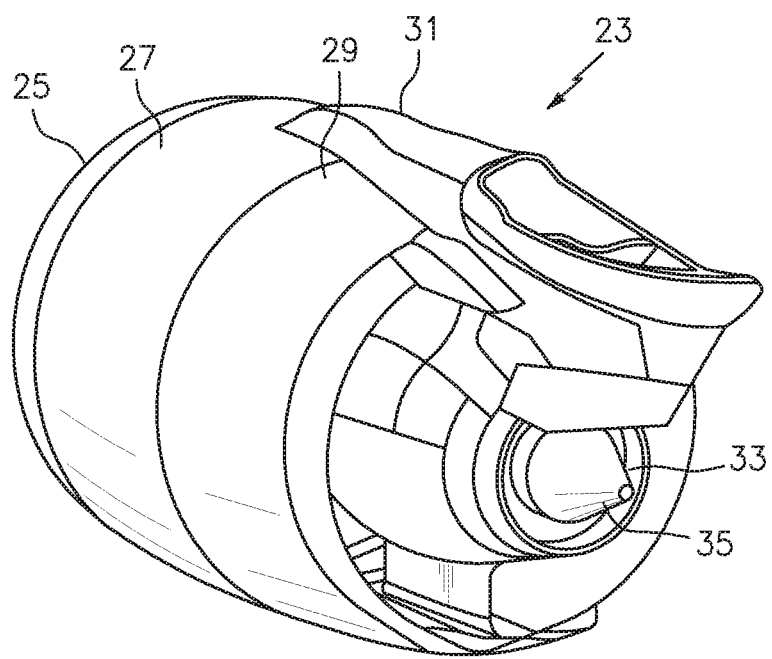
FIG. 2 is a perspective view of a nacelle embodiment.

Referring to FIG. 2, a nacelle 23 for a gas turbine engine is illustrated according to various embodiments. The nacelle 23 may comprise an inlet 25, a fan cowl 27, and a thrust reverser 29. The nacelle 23 may be coupled to a pylon 31, which may mount the nacelle 23 to an aircraft wing or aircraft body. The nacelle 23 may further comprise an exhaust nozzle assembly including an annular nozzle 33 surrounding a generally conically-shaped center body 35. Hot core exhaust gas from a gas turbine engine exits the gas turbine engine between the exhaust nozzle 33 and center body 35.

The present disclosure is directed to a system for connecting components having different coefficients of thermal expansion ("CTE"). A non-limiting example of where a present disclosure connecting system may be utilized is one in which a ceramic skin panel is connected to a metallic support structure (e.g., metallic bracket, etc.) within a gas turbine engine and/or a nacelle system. More specifically, an exhaust nozzle portion of a gas turbine engine or a nacelle system may include ceramic skin panels connected to a metallic support structure, wherein the ceramic skin panels collectively form an annular duct that is supported by one or more metallic brackets; e.g., as part of a ring structure, or attached to a ring structure. To facilitate an enabling description herein, the present disclosure is described in terms of a nacelle system exhaust nozzle. The present disclosure is not, however, limited to a nacelle system exhaust nozzle application.

Figure 3:
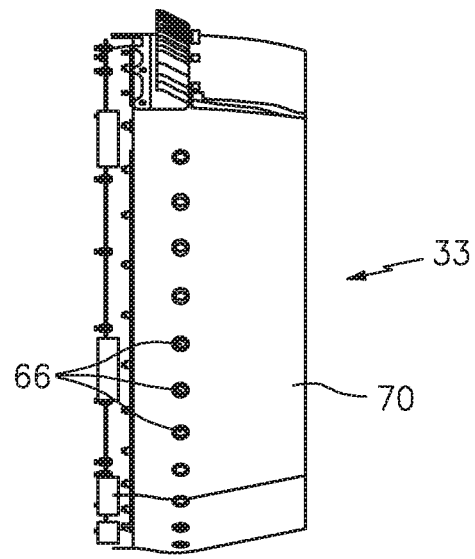
FIG. 3 is a side view of an exemplary nacelle system exhaust nozzle embodiment.
Figure 4:
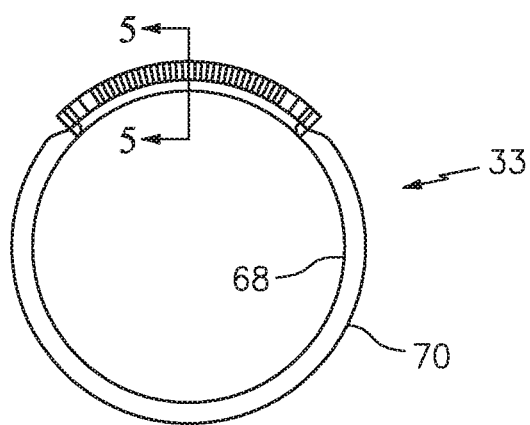
FIG. 4 is an end view of the exhaust nozzle embodiment shown in FIG. 3.
Figure 5:
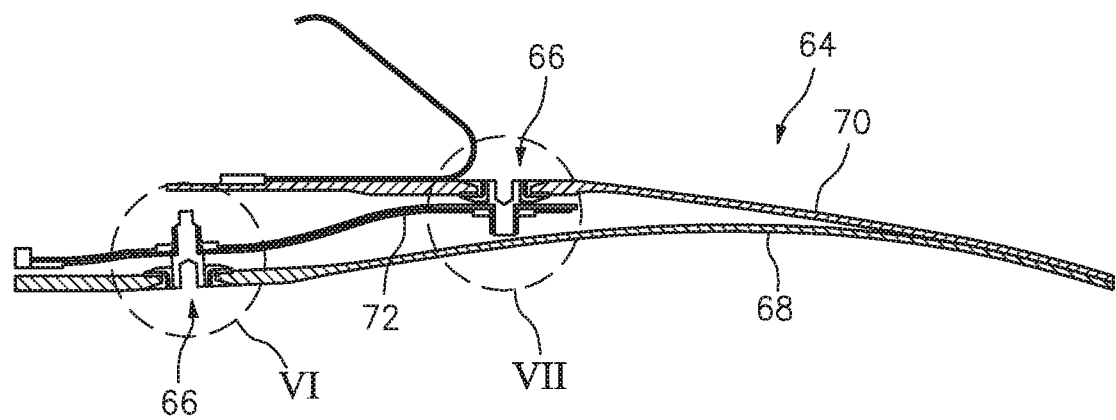
FIG. 5 is a partial sectional view of the exhaust nozzle shown in FIGS. 3 and 4, taken along the section line 5-5 shown in FIG. 4.
Figure 5A:
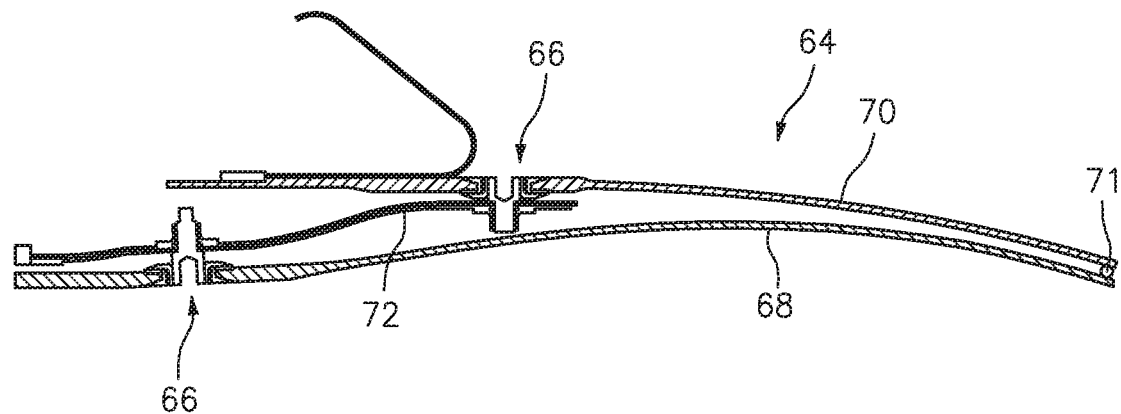
FIG. 5A is a partial sectional view of the exhaust nozzle shown in FIGS. 3 and 4, taken along the section line 5-5 shown in FIG. 4, including a seal.

FIG. 3 is a side view of an exemplary nacelle system exhaust nozzle 33 with which the present disclosure connection system 66 may be utilized. FIG. 4 is an end view of an exhaust nozzle 33 like that shown in FIG. 3. FIG. 5 is a partial sectional view of the exhaust nozzle 33 shown in FIGS. 3 and 4, taken along the section line 5-5 shown in FIG. 4. As can be seen in FIGS. 4 and 5, the exhaust nozzle 33 may comprise of a separate inner skin panels 68 and exterior skin panels 70; or a single skin panel. Referring to FIG. 5A, if separate inner and outer skin panels 68, 70 are used, a seal 71 may be disposed in-between the aforesaid inner and outer skin panels 68, 70 adjacent the aft end of the skin panels 68, 70. In some embodiments, the seal 71 may extend circumferentially between the aft portions of all of the plurality of inner skin panels 68 and the aft portion of all of the plurality of the outer skin panels 70. The seal 71 may be attached to the inner skin panel 68, or the outer skin panel 70, or both. The present disclosure is not limited to any particular mechanism for attaching the seal. Acceptable examples of attachment include attaching the seal by a bonding material such as a ceramic type adhesive, or a mechanical attachment; e.g., using an increased number of plies in one or both on the inner and outer skin panels 68, 70. The present disclosure is not limited to any particular type of seal 71. Acceptable examples of seals 71 include a braided material (e.g., having a circular or oval or square cross-sectional geometry) consisting of high temperature fibers such as fiber glass, silicate, alumino silicate, boroalumino silicate, silicon carbide, silicon oxycarbide—or the like. In some embodiments, the seal may have a Polytetrafluoroethylene (PTFE) coating. In some embodiments, the seal may be impregnated with boron nitride, silicon nitride, vermiculite, graphene nanoplatelet or graphite dispersant. Depending on the particular seal used and the particular application, the seal 71 may be configured to mitigate skin panel 68, 70 wear due to vibration and/or thermal gradients that may occur during operation. Again, depending on the particular seal used and the particular application, the seal may also be configured to act as at least one of a stiffener, a damper (e.g., to mitigate vibrational modes), and/or as an acoustic baffle. Due to the large thermal gradient that occurs during operation of the engine, the concomitant thermal loading, and the relatively low mechanical strength of ceramic materials, it may be preferable to utilize separate inner and outer skin panels.

Figure 6:
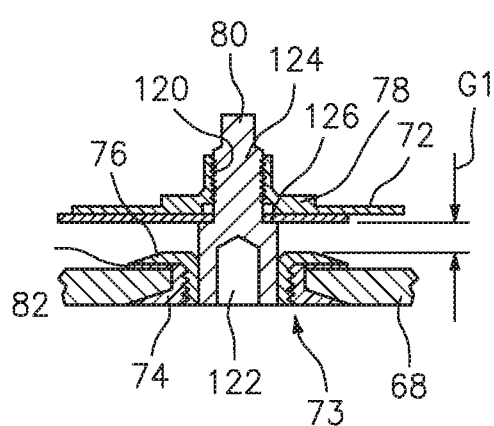
FIG. 6 is an enlarged view of a present disclosure connection system shown in FIG. 5, depicting the connection system within a first temperature environment.
Figure 7:
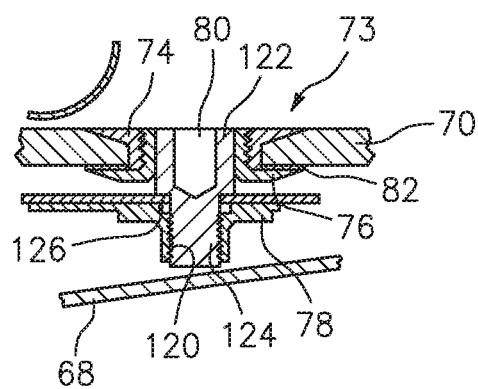
FIG. 7 is an enlarged view of a present disclosure connection system shown in FIG. 5.

Referring to FIGS. 5-7, a plurality of the present disclosure connection systems 66 are used to connect the respective inner and outer skin panels 68, 70 to a metallic support structure 72. In the exhaust nozzle 33 application, the inner and outer skin panels 68, 70 and the support structure 72 form an annular structure. As will be understood from the present description, the present disclosure connection system 66 embodiments provide particular utility for skin panels that form an annular structure. The present disclosure is not, however, limited to applications wherein the skin panels form an annular structure.

An example of a skin panel 68, 70 that may connected to a metallic support structure 72 using an embodiment of the present disclosure connecting system is a skin panel 68, 70 comprised of a ceramic material such as a ceramic matrix composite (CMC). A CMC may generally comprise one or more ceramic materials disposed on or within another material, such as, for example, a ceramic material disposed within a structure comprised of a fibrous material. Fibrous materials, such as carbon fiber, aramid fibers, fiberglass fibers, and the like may be formed into fibrous structures suitable for this purpose. Deposition of a ceramic material into or onto a fibrous material may be accomplished using chemical vapor infiltration (CVI), melt infiltration (MI), and slurry casting (SC) may be used, alone or in various combinations, to partially or fully impregnate a fibrous structure with the ceramic material. The present disclosure is not limited for use in connecting ceramic material panels. The present disclosure provides considerable utility for connecting panels comprised of a variety of materials having a low coefficient of thermal expansion ("CTE") relative to the CTE of a metallic structure to which it is to be connected; e.g., carbon-carbon composites, ceramic materials, ceramic matrix composites, graphite, The metallic support structure 72 that may be connected to a skin panel 68, 70 is typically comprised of a metallic material having a CTE that is substantially greater than the CTE of the skin panel 68, 70. The present disclosure is not limited to use with any particular metallic support structure configuration, or any particular type of metallic material unless otherwise described herein. An example of a metal alloy that may be used to form a metallic support structure 72 component is a nickel and chromium based alloy such as Inconel®, which is available from Special Metals Corporation of New Hartford, N.Y., USA. Another example of a support structure metallic material is a titanium alloy such as titanium-zirconium-molybdenum (TZM).

Figure 6A:
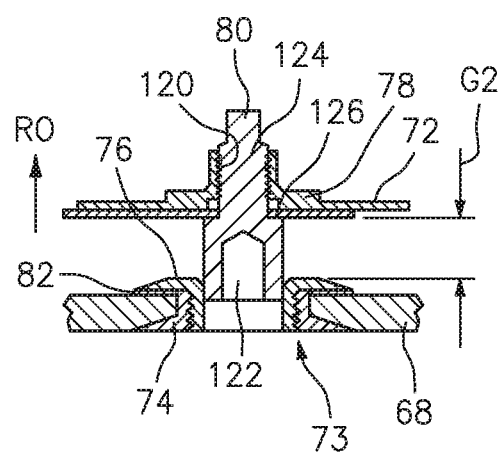
FIG. 6A is an enlarged view of a present disclosure connection system shown in FIG. 5, depicting the connection system within a second temperature environment.

FIGS. 6 and 6A illustrate a cross section of a connection system 66 embodiment utilized to connect an inner skin panel 68 to the support structure 72. FIG. 7 illustrates a cross section of a connection system 66 embodiment utilized to connect an exterior liner panel 70 to the support structure 72. Both of these connection systems 66 include a bushing 73, a support structure nut plate 78, and a bolt 80. The bushing 73 includes a housing 74 and a collar 76. In some embodiments, a connection system 66 may include a washer 82. In alternative embodiments, the connection system 66 may not utilize a nut plate 78, but rather may utilize a different mechanism that permits the bolt 80 to engage the support structure 72; e.g., a clip, a threaded aperture, etc.

Figure 8:
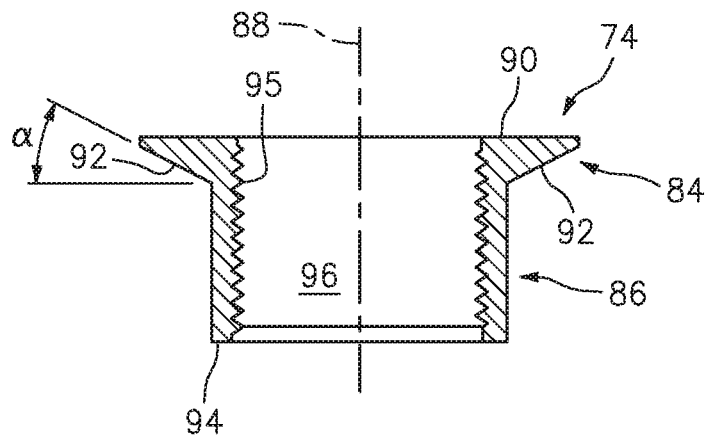
FIG. 8 is a sectional view of a bushing housing embodiment.

Referring to FIG. 8, the housing 74 includes a head 84, a body 86, and an axial centerline 88. The head 84 includes an exterior surface 90 and a tapered contact surface 92. The head 84 may include features configured to facilitate attachment; e.g., female apertures configured to permit engagement with a pin wrench, etc. The tapered contact surface 92 is disposed at an angle alpha ("α") relative to the axial centerline 88; i.e., the angle alpha is the included angle formed between the tapered contact surface 92 and a line extending perpendicular to the axial centerline 88. The body 86 has a first end contiguous with the head 84 and a distal end 94 disposed at the opposite end. The axial length of the housing 74 extends between the exterior surface 90 of the head 84 and the distal end 94 of the body 86. An axial bore 96 extends through the head 84 and the body 86. At least a portion of the inner diameter surface 95 of the axial bore 96 is threaded. The present disclosure is not limited to any particular type of thread configuration.

Figure 9:
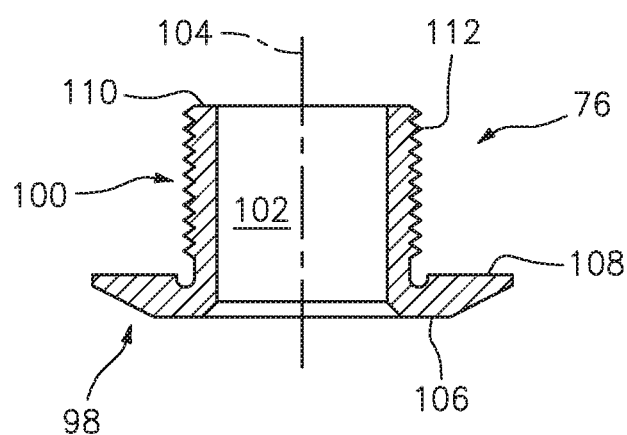
FIG. 9 is a sectional view of a bushing collar embodiment.

Referring to FIG. 9, the collar 76 includes a head 98, a body 100, a center bore 102, and an axial centerline 104. The head 98 includes an exterior surface 106 and a contact surface 108. The head exterior surface 106 may include features configured to facilitate attachment; e.g., female apertures configured to permit engagement with a pin wrench, etc. The contact surface 108 may be disposed perpendicular to the axial centerline 104. The body 100 has a first end contiguous with the head 98, a distal end 110 disposed at the opposite end, and an exterior surface 112. The axial length and center bore 102 of the collar 76 extends between the head exterior surface 106 and the body distal end 110. At least a portion of the body exterior surface 112 is threaded. The threaded portion of the collar body 100 and the threaded portion of the housing 74 are configured to have mating threads; i.e., the collar 76 and the housing 74 may be attached to one another by threaded engagement. In this threaded arrangement, the housing 74 may be viewed as the female half of a threaded pair, and the collar 76 as the male half of the threaded pair. In alternative embodiments, the male and female respective configurations of the housing 74 and the collar 76 may be reversed.

Figure 11:
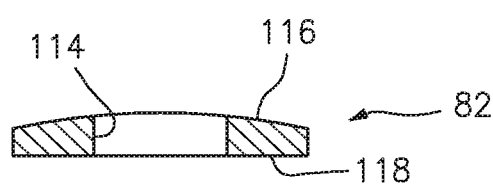
FIG. 11 is a sectional view of a washer embodiment.

Referring to FIG. 11, some embodiments of the present disclosure connection system 66 include a washer 82. The washer 82 includes an axial bore 114, a panel contact surface 116 and a collar contact surface 118. The axial bore 114 is sized to receive the collar body 100, and may also be sized to receive the housing body 86 as well. In some embodiments, the panel contact surface 116 is contoured to mate with the skin panel 68, 70; e.g., if the skin panel 68, 70 is arcuately shaped (e.g., a skin panel in an annular structure), the panel contact surface 116 may be arcuately configured to enable substantially all of the panel contact surface 116 to be in contact with the surface of the skin panel 68, 70 when the connection system 66 is installed.

The support structure nut plate 78 is configured to be attached (e.g., by mechanical fastener such as a rivet, or weld, etc.) to the support structure 72. The support structure nut plate 78 includes a body having a threaded aperture 120.

Figure 12:
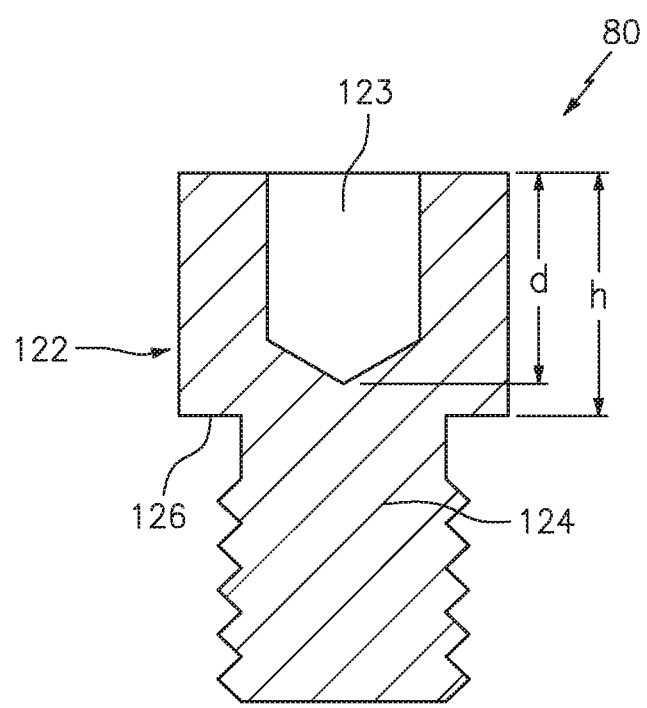
FIG. 12 is a sectional view of a bolt.

Referring to FIG. 12, the bolt 80 (sometimes referred to as a screw) has a head 122 and a body 124. The head 122 includes a shoulder surface 126. The body 124 extends axially outwardly from the head 122 at the shoulder surface 126. At least a portion of the body 124 is configured with a thread that mates with the threaded aperture 120 of the support structure nut plate 78. In some embodiments, the head 122 of the bolt 80 includes a tool engagement cavity 123 typically configured to receive a tool for driving the bolt 80; e.g., a "socket head cap bolt or screw" has a hexagonal tool engagement cavity 123 configured to receive a hexagonal shaped driving tool. Some embodiments of the present disclosure utilize bolts 80 having a cavity depth "d" that is less than the height "h" of the head 122. The difference between the cavity depth "d" and the head height "h" is typically chosen to impart robust mechanical strength to the bolt; e.g., strength adequate to accommodate torque loads during installation and removal of the bolt 80.

Figure 10:
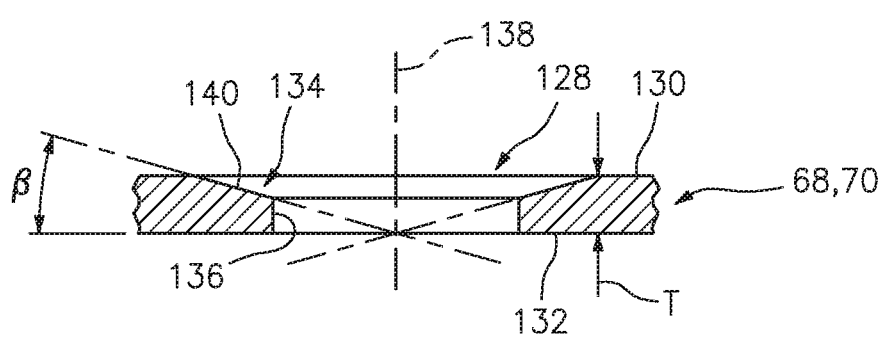
FIG. 10 is a sectional partial view of a ceramic skin panel embodiment.

Referring to FIG. 10, the bushing 73 (e.g., see FIGS. 6-7) is configured to be installed within an aperture 128 disposed within the skin panel 68, 70. The aperture 128 extends through the skin panel 68, 70 between an exterior surface 130 and an interior surface 132. The skin panel 68, 70 has a thickness "T" that extends between the exterior surface 130 and the interior surface 132. The aperture 128 includes a chamfered portion 134 contiguous with the exterior surface 130 of the skin panel 68, 70, and an axial portion 136. The axial portion 136 extends between the chamfered portion 134 and the interior surface 132 of the skin panel 68, 70. Both the chamfered portion 134 and the axial portion 136 are symmetric about the axial centerline 138 of the aperture 128. The chamfered portion 134 includes a tapered surface 140 that is disposed at an angle beta ("β") relative to the axial centerline 138 of the aperture 128; i.e., the angle beta is the included angle formed between the tapered contact surface 140 and a line extending perpendicular to the axial centerline 138 of the aperture 128. The tapered surface 140 is configured such that a line coincident with the tapered surface 140 intersects the axial centerline 138 of the aperture 128 at the plane of the interior surface 132 of the skin panel 68, 70.

Referring to FIGS. 6-11, during installation of the present disclosure connection system 66, the housing body 86 is inserted within the aperture 128 so that the tapered contact surface 92 of the housing head 84 is received within the chamfered portion 134 of the aperture 128. The tapered contact surface 92 of the housing head 84 mates with the tapered surface 140 of the aperture 128, and together they allow the housing 74 to be countersunk within the skin panel 68, 70. The housing body 86 extends through the axial portion 136 of the aperture 128, and the distal end 94 of the housing body 86 may be about flush with the interior surface 132 of the skin panel 68, 70.

In those embodiments that include a washer 82, the collar body 100 may be inserted through the washer axial bore 114, with the contoured panel contact surface 116 of the washer 82 facing the interior surface 132 of the skin panel 68, 70.

The collar body 100 is partially received within the housing 74 axial bore 96, and the collar 76 and the housing 74 are rotated relative to one another to establish threaded engagement between the collar 76 and the housing 74. The mating configuration of the tapered contact surface 92 of the housing head 84 and the tapered surface 140 of the aperture 128, and the relative axial lengths of the housing 74 and the collar 76 allow the housing 74 and the collar 76 to apply a limited amount of compressive force to the liner panel 68, 70. Hence, the relative axial lengths of the housing 74 and the collar 76 are chosen relative to the thickness "T" of the skin panel 68, 70 so that the housing 74 and the collar 76 have additional relative threaded engagement and do not physically prevent the aforesaid application of compressive force. The compressive force is adequate to prevent rotation of the bushing 73 (i.e., the housing 74 and/or the collar 76) relative to the liner panel 68, 70. At the same time, the amount of compressive force is below that which would cause deformation of the liner panel 68, 70 in an amount that would produce detrimental stress and/or fracture within the liner panel 68, 70. Hence, the bushing 73 of the present disclosure connection system 66 avoids wear that may occur with a bushing that is free to rotate, and at the same time prevents excessive deformation of the liner panel 68, 70 in an amount that may create detrimental stress and/or fracture. In addition, skin panels 68, 70 comprising different ceramic materials may have different CTE characteristics. For example, a ceramic skin panel 68, 70 comprising a ceramic material may have orthotropic CTE characteristics, or isotropic laminate/interlaminate CTE characteristics, etc. We discovered that a tapered surface 140 of the aperture 128 (i.e., at angle beta "β") within the skin panel 68, 70 disposed such that a line coincident with the tapered surface 140 intersects the axial centerline 138 of the aperture 128 at the plane of the interior surface 132 of the skin panel 68, 70, works well with a bushing 73 like that described herein not only for skin panels 68, 70 comprised of a ceramic material having orthotropic CTE properties, but also for skin panels 68, 70 having isotropic laminate/interlaminate CTE characteristics. Hence, the present disclosure provides considerable utility when used with a variety of different types of ceramic skin panels 68, 70.

The support structure nut plate 78 is attached to the support structure 72 in a position wherein the axial centerline of the threaded aperture 120 of the nut plate 78 is aligned with the axial centerline 138 of the aperture 128, and therefore the axial centerlines 88, 104 of the housing 74 and collar 76. The bolt 80 is inserted through the housing 74, and is threaded into the threaded aperture 120 of the support structure nut plate 78. The bolt head 122 forms a slide fit with the center bore 102 of the collar 76. The bolt 80 is threaded until the bolt shoulder surface 126 is in contact with either the support structure 72 or the nut plate 78.

The present disclosure connection system 66 embodiments may be utilized in operating environments that vary widely in temperatures; e.g., from −65° F. to 4082° F. (−54° C. to 2250° C.), and the thermal environment may cycle (e.g., up and down) within the aforesaid temperature range. The metallic support structure 72 may expand radially more than the liner panel 68, 70 in response to the same increase in temperature. FIG. 6 illustrates a connection system 66 in a first configuration at a first temperature ("T1"). FIG. 6A illustrates the same connection system 66 in a second configuration at a second temperature (T2"). The first temperature T1 is lower than the second temperature T2. At the higher temperature T2, the support structure 72 will move radially outward (see arrow "RO" in FIG. 6A) more than the skin panel 68 due to the differences in their respective CTEs. In FIG. 6, there is a gap "G1" (i.e., a radial space) disposed between the collar 76 and the support structure 72 and the bolt head 122 is about flush with the surface of the skin panel 68. In FIG. 6A, there is an expanded gap "G2" (i.e., G2>G1) disposed between the collar 76 and the support structure 72 and bolt head 122 is below flush as a result of greater radial growth of the metallic support structure 72 relative to the liner panel 68, 70 as a result of the differences in CTE there between. As can be seen in FIGS. 6 and 6A, the slide fit between the bolt head 122 and the bushing 73 allows the relative radial movement without binding. Hence, forces and attendant stresses applied to the liner panel 68, 70 that may have otherwise been imposed on the liner panel 68, 70 are avoided.

While the connection system 66 embodiments described herein have been described in the context of aircraft applications, one will appreciate in light of the present disclosure that the system described herein may be used in connection with various other vehicles, for example, a launch vehicle, a spacecraft, an unmanned aerial vehicle, a missile, cars, trucks, busses, trains, boats, and submersible vehicles, or any other vehicle or device, or in connection with industrial processes, or propulsion systems, or any other system or process having different materials exposed to fluctuating temperatures.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. As another example, as stated above we discovered that a tapered surface 140 of the aperture 128 (i.e., at angle beta "β") within the skin panel 68, 70 disposed such that a line coincident with the tapered surface 140 intersects the axial centerline 138 of the aperture 128 at the plane of the interior surface 132 of the skin panel 68, 70, works well with a bushing 73 like that described herein. The description above also describes the slide fit between the bolt head 122 and the bushing 73 that allows the relative radial movement without binding; e.g., allows differential radial expansion/contraction between the metallic support structure 72 and the liner panel 68, 70. In alternative embodiments, the benefits of the bushing 73 geometry (e.g., the tapered surface 140 at an angle beta such that a line coincident with the tapered surface 140 intersects the axial centerline 138 of the aperture 128 at the plane of the interior surface 132 of the skin panel 68, 70) may be provided with a bushing 73 and bolt 80 combined, and in some embodiments with a nut plate 78 having a nut that is configured for radial displacement (e.g., a sliding nut that permits the differential radial expansion/contraction between the metallic support structure 72 and the liner panel 68, 70.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A mechanical connection system, comprising:
  a ceramic skin panel having a first surface, a second surface, and at least one aperture extending between the first surface and the second surface, the aperture having an axial centerline, a chamfered portion contiguous with the first surface, and an axial portion contiguous with the second surface, wherein the chamfered portion includes a tapered surface disposed at a first angle such that a line extending along the tapered surface intersects the axial centerline at a plane of the second surface;
  at least one bushing having a housing and a collar, the housing having a head configured to mate with the chamfered portion of the at least one aperture disposed within the ceramic skin panel, and a body configured to extend within the at least one aperture, and the collar is configured for engagement with the housing from the second surface of the ceramic skin panel; and at least one bolt configured for engagement with the bushing and a support structure.

2. The connection system of claim 1, further comprising a nut plate affixed to the support structure, wherein the bolt is configured for engagement with the support structure via the nut plate.

3. The system of claim 1, wherein the ceramic skin panel is a ceramic matrix composite.

4. The system of claim 1, wherein the ceramic skin panel has a first coefficient of thermal expansion (CTE) value, and the support structure has a second CTE value, and the first CTE value is less than the second CTE value.

5. The system of claim 4, wherein the support structure comprises a metallic material.

6. The system of claim 4, wherein the support structure comprises a nickel alloy.

7. The system of claim 1, wherein the collar includes a head, a body, and a center bore extending through the body; and wherein the ceramic skin panel is arcuately shaped to form a part of an annular structure; and wherein the system further comprises a washer having a first contact surface and a second contact surface, the second contact surface is opposite the first contact surface, wherein the first contact surface is configured to mate with the head of the collar and the second contact surface is configured to mate with the arcuate shape of the ceramic skin panel; and wherein the washer is disposed between the collar and the ceramic skin panel.

8. The system of claim 1, wherein the housing, the collar, and the washer are configured to permit sufficient compressive attachment of the bushing to the ceramic skin panel in an amount that prevents rotation of the bushing relative to the ceramic skin panel without deformation of the ceramic skin panel in an amount that produces detrimental mechanical properties within the ceramic skin panel.

9. A gas turbine engine nacelle, comprising:

an annular support structure;

a plurality of ceramic skin panels attached to the annular support structure, the plurality of ceramic skin panels collectively forming at least a portion of a first annular duct;

wherein each ceramic skin panel has a first surface, a second surface, and a plurality of apertures extending between the first surface and the second surface, the apertures each having an axial centerline, a chamfered portion contiguous with the first surface, and an axial portion contiguous with the second surface, wherein the chamfered portion includes a tapered surface disposed at a first angle such that a line extending along the tapered surface intersects the axial centerline at a plane of the second surface; and a plurality of connection systems, each connecting a respective one of the ceramic skin panels to the support structure, the connection system including a bushing for connecting the ceramic skin panel to the annular support structure, each bushing having a housing and a collar, the housing having a head configured to mate with the chamfered portion of one of the apertures disposed within the ceramic skin panel, and a body configured to extend within the aperture, and the collar is configured for engagement with the housing from the second surface of the ceramic skin panel, and a bolt configured for engagement with the bushing and the support structure.

10. The nacelle of claim 9, wherein each connection system further comprises a nut plate affixed to the support structure, wherein the bolt is configured for engagement with the support structure via the nut plate.

11. The nacelle of claim 9, wherein the ceramic skin panels are each a ceramic matrix composite.

12. The nacelle of claim 9, wherein the ceramic skin panels each have a first coefficient of thermal expansion (CTE) value, and the support structure has a second CTE value, and the first CTE value is less than the second CTE value.

13. The nacelle of claim 12, wherein the support structure comprises a metallic material.

14. The nacelle of claim 12, wherein the support structure comprises a nickel alloy.

15. The nacelle of claim 9, wherein the collar of each connection system includes a head, a body, and a center bore extending through the body; and wherein the ceramic skin panels are each arcuately shaped; and wherein each connection system further comprises a washer having a first contact surface and a second contact surface, the second contact surface is opposite the first contact surface, wherein the first contact surface is configured to mate with the head of the collar and the second contact surface is configured to mate with the arcuate shape of the ceramic skin panel; and wherein the washer is disposed between the collar and the ceramic skin panel.

16. The nacelle of claim 15, wherein the housing, the collar, and the washer of each connection system are configured to permit sufficient compressive attachment of the bushing to the ceramic skin panel in an amount that prevents rotation of the bushing relative to the ceramic skin panel without deformation of the ceramic skin panel in an amount that produces detrimental mechanical properties within the ceramic skin panel.

17. The nacelle of claim 9, wherein the plurality of ceramic skin panels attached to the annular support structure, include a plurality of inner skin panels that collectively form the at least a portion of the first annular duct, and a plurality of outer skin panels that collectively form at least a portion of a second annular duct disposed radially outside of the first annular duct.

18. The nacelle of claim 17, wherein a first number of the plurality of connection systems connect the inner skin panels to the support structure and a second number of the plurality of connection systems connect the outer skin panels to the support structure.

19. The nacelle of claim 17, further comprising a seal disposed between an aft portion of at least one of the inner skin panels and an aft portion of a respective one of the outer skin panels, the seal attached to the aft portion of the at least one of the inner skin panels, or the aft portion of the respective one of the outer skin panels, or both.

20. The nacelle of claim 19, wherein the seal extends circumferentially between the aft portions of all of the plurality of inner skin panels and the aft portion of all of the plurality of the outer skin panels.

* * * * *